Oct. 28, 1941.    P. P. MARSHALL    2,261,033
GLASS BENDING MOLD
Original Filed May 29, 1937
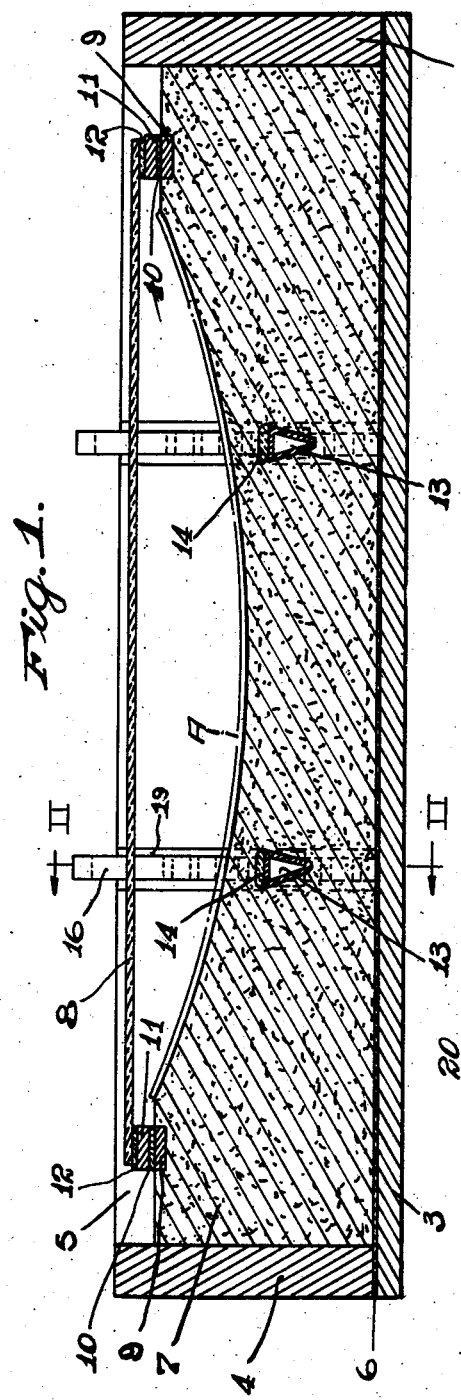
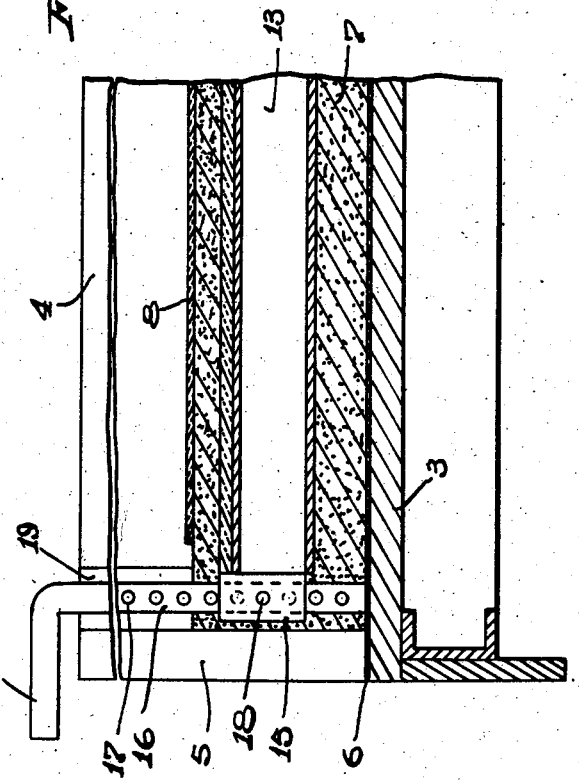
INVENTOR.
PHILIP P. MARSHALL.
BY
ATTORNEYS.

Patented Oct. 28, 1941

2,261,033

UNITED STATES PATENT OFFICE 2,261,033

GLASS BENDING MOLD

Philip P. Marshall, Ford City, Pa., assignor to Pittsburgh Plate Glass Company, Allegheny County, Pa., a corporation of Pennsylvania Original application May 29, 1937, Serial No. 145,412, now Patent No. 2,137,115, dated November 15, 1938. Divided and this application June 28, 1938, Serial No. 216,257

8 Claims. (Cl. 49—67)

The invention relates to a mold for use in the bending of glass sheets, the present application constituting a division of my application, Serial No. 145,412, filed May 29, 1937, now Patent No. 2,137,115, dated Nov. 15, 1938. The mold is preferably used in connection with a tunnel kiln, as set forth in said application, but might be used with other types of kiln, if desired. In accordance with the preferred practice, the molds are mounted on cars and carried through a kiln of progressively increasing temperature to bring the glass sheets carried thereby to a temperature at which they are bent by gravity and settle into the molds. In a further travel through the kiln, the temperature is reduced to a point somewhat below the critical annealing range, at which time, the glass has set, permitting the removal of the sheets from the molds. By lifting members embedded in the sand of the mold beneath the bent sheets, such sheets are now removed from the molds and transferred to a cooling tunnel through which they are carried and reduced in temperature to a point at which they may be handled. The cars with the molds thereon are returned, after the removal of the glass sheets, to their starting position to repeat the cycle. The molds are made ready for reuse by returning the lifting members to their original positions and smoothing over the sand above the members. The mold is illustrated and described as bending a single sheet of glass, but if desired, two sheets, one upon the other, may be bent at one operation in accordance with Sherts and Willis Patent No. 1,815,992. The primary object of the present invention is the provision of an improved mold for carrying out the process as above described. One embodiment of the invention is shown in the accompanying drawing, wherein:

Figure 1 is a transverse section through the mold. And Fig. 2 is a partial section on the line II—II of Fig. 1, but with the glass sheet in bent position.

The container portion of the mold comprises the metal bottom plate 3, the side plates 4, 4, and the end plates 5 also of metal. The bottom plate 3 also preferably carries a layer of asbestos 6, which acts as a seal between the bottom plate and the plates 4 and 5. The container carries mold material 7, which is ordinarily a body of sand mixed with finely divided fire clay of such consistency that the mol will maintain its contour after being shaped so that the surface has the desired curvature. This curvature may be of various shapes depending upon requirements and several plates may be bent in the same mold if the size is small. The means employed to secure the desired contour in sand molds are the same as those heretofore employed in the art, templates being used to smooth off the sand to the desired shape.

The edges of the glass sheet 8 to be bent are preferably supported, as indicated in Fig. 1. The metal strip 9 is embedded in the sand along each side of the mold and carries a strip of asbestos 10 on which is a second metal strip 11, which carries a strip of asbestos 12. In the bending operation, the edges of the glass sheet move inward and the parts 11 and 12 slide with them on the surface of the strips 10 until the sheet is well settled in the mold, at which time the strips 11 and 12 are removed from the mold by operators working through openings in the side walls of the tunnel kiln. The glass finally reaches the dotted line position A, indicated in Fig. 1, the bent sheet being shown in full lines in Fig. 2. At a later stage in the operation, when the surface of the mold is being smoothed over for another operation, the metal strips 9 act as guides upon which the bars carrying the template may rest in the movement of the template longitudinally of the mold.

Provision is made for lifting the bent sheet from the mold when the car carrying such mold reaches a point in the kiln, where the temperature has dropped to a point somewhat below the critical annealing range, in the form of a pair of metal bars 13, 13 embedded in the sand and having a length slightly greater than that of the sheet. These bars are preferably hollow, as indicated in Fig. 1, and of wedge form to facilitate forcing them down through the sand to the desired position. The upper faces of the bars are preferably provided with layers of asbestos 14, which act as insulation and to prevent any marring of the glass when the sheet is lifted from the mold. Each bar is provided at its end with a rectangular guide socket 15 and through this socket extends a supporting bar 16 provided with a series of perforations 17. The sides of the socket 15 are provided with perforations through which a pin 18 extends for locking the member 16 to the socket. This permits the bars to be used with molds having different degrees of curvature, since the bars must set at different distances from the bottom of the container, depending upon the curvature of the face of the mold. The walls 5 of the mold are slotted, as indicated at 19, to receive the members 16 and sockets 15, such slots serving as guides to maintain the members 16 in vertical position and in the same relative position at the two sides of the container. The ends of the bars 16 are bent laterally, as indicated at 20, and serve as means for lifting the bars 13 and the glass sheet carried thereby from the mold after the sheet has set and its temperature arrived at a point somewhat below the lower limit of the critical annealing range.

After the bent sheet has been removed from the mold, it is carried through a cooling tunnel, in which its temperature is allowed to drop gradually to the point at which it can be conveniently handled. The mold is prepared for reuse by returning the lifting bars 13 to their original position as shown in the drawing, the openings in the sand above the bars being restored by the use of a template as heretofore referred to. The mold can now be returned on its car to the entrance end of the leer and the cycle repeated. This return to the entrance end of the leer can be accomplished without allowing the mold to completely cool off so that a large part of the heat stored in the mold is made available for the next cycle. This is a matter of considerable economy since the weight of the mold in proportion to the weight of the material handled is relatively high and it is thus possible to reuse the mold with a starting temperature from 300 to 400 deg. F.

What I claim is:

1. A mold for use in bending a glass sheet comprising a metal container, a body of unbonded particles of refractory material in the container having its surface rounded to the contour of the glass sheet to be bent, and lifting members embedded in the material of the mold beneath the surface thereof and adapted to pass through the body of unbonded particles and lift the glass sheet from the mold after it has been bent to fit the contour of the mold.

2. A mold for use in bending a glass sheet comprising a metal container, a body of unbonded particles of refractory material in the container having its surface rounded to the contour of the glass sheet to be bent, lifting bars embedded in the material of the mold beneath the surface thereof and movable through said body for lifting the bent sheet, and lifting members connected to the bars and extending to the exterior of the mold.

3. A mold for use in bending a glass sheet comprising a metal container, a body of unbonded particles of refractory material in the container having its surface rounded to the contour of the glass sheet to be bent, lifting bars embedded in the material of the mold beneath the surface thereof and movable through said body for lifting the bent sheet, means resting on the bottom of the container for supporting the bars at varying distances from said bottom.

4. A mold for use in bending a glass sheet comprising a metal container, a body of unbonded particles of refractory material in the container having its surface rounded to the contour of the glass sheet to be bent, lifting bars embedded in the material of the mold beneath the surface thereof and movable through said body for lifting the bent sheet, and lifting members connected to the bars and extending to the exterior of the mold, said bars being of wedge cross section to facilitate forcing them downward through the molding material.

5. A mold for use in bending a glass sheet comprising a metal container, a body of unbonded particles of refractory material in the container having its surface rounded to the contour of the glass sheet to be bent, metal lifting bars embedded in the material of the mold beneath the surface thereof and movable through said body for lifting the bent sheet, a layer of asbestos composition on the upper face of each bar, and lifting members connected to the ends of the bars and extending upward to the exterior of the body of refractory material.

6. A mold for use in bending a glass sheet comprising a metal container, a body of unbonded particles of refractory material in the container having its surface rounded to the contour of the glass sheet to be bent, lifting members embedded in and movable through said body to deform the latter and lift the glass therefrom, a flat metal strip extending longitudinally of the mold on each side of the mold cavity embedded in the refractory material so that its upper surface is flush with the surface of the material, and a second strip of metal imposed on each of said first strips and having a layer of asbestos on its upper face.

7. In a glass bending mold, a body of unbonded particles of refractory material having a molding surface for molding a sheet of glass at bending temperature, and means normally disposed in the body of material beneath the surface thereof and movable therefrom to deform said body and to carry the glass sheet therefrom.

8. In a glass bending mold, a body of unbonded particles of refractory material having a molding surface conforming in shape to a bend to be effected in a glass sheet supported thereon, and means embedded beneath the surface of said body and movable therefrom to carry bent glass from the mold.

PHILIP P. MARSHALL.